United States Patent [19]

Homefeld

[11] Patent Number: 5,103,554
[45] Date of Patent: Apr. 14, 1992

[54] APPARATUS FOR MOUNTING A CABLE WORKING TOOL

[76] Inventor: David R. Homefeld, 4036-196A Street, Langley, British Columbia, Canada, V3A 5S6

[21] Appl. No.: 533,824

[22] Filed: Jun. 6, 1990

[51] Int. Cl.⁵ .............................................. H01R 43/00
[52] U.S. Cl. ...................................... 29/753; 29/281.6; 29/745; 29/747; 269/2; 248/61
[58] Field of Search ............... 29/281.6, 745, 732, 29/747, 753, 751, 762, 631, 764; 269/1, 2; 248/61, 63, 228, 229, 231.3, 231.4, 231.7

[56] References Cited

U.S. PATENT DOCUMENTS

| | | | |
|---|---|---|---|
| 2,271,616 | 2/1942 | Beale | 248/231.4 |
| 3,528,155 | 9/1970 | Marshall | |
| 3,713,214 | 1/1973 | Enright et al. | 29/628 |
| 3,742,564 | 7/1973 | Dyksterhouse | 29/203 |
| 3,858,302 | 1/1975 | Abarotin | 29/427 |
| 3,890,689 | 6/1975 | Copas | 29/203 |
| 4,042,200 | 8/1977 | Overall | 248/223.1 |
| 4,092,019 | 5/1978 | Young | 269/296 |
| 4,512,828 | 4/1985 | Helm | 156/49 |

OTHER PUBLICATIONS

Precision Communications Inc., P.O. Box 9114, Riverside, Calif. 92504 Advertising brochure for Precision Mount Universal Mounting Device.
B.C. Tel Outside Plant Bulletins: vol. 1 No. 131 Jul. 1984 vol 1 No. 153 Nov. 1984 British Columbia Telephone Company, 3777 Kingsway, Burnaby, British Columbia Canada V5H 3Z7

*Primary Examiner*—Carl E. Hall
*Attorney, Agent, or Firm*—Bull, Housser & Tupper

[57] ABSTRACT

An apparatus for mounting a cable working tool comprises a tool adapter, an elongated rigid support bar for supporting the tool adapter and first and second clamping members for rigidly holding the support bar. Each of the first and second clamping members has two jaws, at least one of which is moveable, for mounting the first and second members to an object. The apparatus may also be used as a tool itself for moving the end plates of a cable splice enclosure relative to each other to facilitate re-assembly of torque bars onto the end plates after maintenance on a splice has been performed.

17 Claims, 4 Drawing Sheets

APPARATUS FOR MOUNTING A CABLE WORKING TOOL

BACKGROUND OF THE INVENTION

This invention relates to a tool holder for use with tools for performing maintenance on communications cables or the like.

In the telecommunications industry, there often arises a need to splice two multi-conductor cables together. Such cables may contain thousands of wire or conductor pairs requiring splicing. Splicing is usually performed using a specialized tool or tools adapted for that purpose. With thousands of wire or conductor pairs to splice, it is impractical to require a technician to support the tool himself as this renders the job of splicing awkward and very time consuming.

Devices have been devised to alleviate the problem of supporting the tool by providing specialized tool support apparatuses. One such device is shown in U.S. Pat. No. 3,713,214, issued to Minnesota Mining and Manufacturing Company. The device described therein clamps onto opposite cables to be spliced and simplifies the task of cable splicing. However, the cables themselves are not totally rigid, and the means of clamping the tool to the cables also are not totally rigid, and thus the tool can have undesirable movement with respect to the wire pairs which increases difficulty of splicing.

Recent trends in telecommunications technology have introduced the use of cable splice enclosures which are used to enclose the splice area between the two cables. Such enclosures keep the splice dry and clean. With such an enclosure however, space is limited and devices such as that described in the above mentioned patent are rendered awkward, difficult, or even impossible to use.

Thus, there is a need for a cable working tool holder which is versatile and can be used when working on a splice in a cable splice enclosure, or can be used on splices made outside such an enclosure.

SUMMARY OF THE INVENTION

The invention reduces the difficulties and disadvantages of the prior art by providing a tool holder which can be easily and securely located, relative to a cable splice enclosure and thus reduce the said undesirable movement relative to the cable which can otherwise occur.

An apparatus according to the invention includes an elongated rigid support bar for supporting a tool, and first and second clamping members for rigidly holding the support bar. Each of the first and second clamping members has two jaws, at least one of which is moveable relative to the other for mounting the clamping members to an object. The apparatus may be secured directly to opposite end plates of a cable splice enclosure, the first and second clamping members acting as first and second clamping means for clamping the support bar to the opposite end plates. Alternatively, the first and second clamping members may be used to clamp the apparatus to other structure such as an A-frame stand or racks in a wiring closet. Or, the first and second clamping members may be secured to a wall using screws.

The apparatus has a further use in that it may be used as a tool itself for moving the end plates of a cable splice enclosure relative to each other to facilitate re-assembly of torque bars onto the end plates after maintenance on a splice has been performed.

DETAILED DESCRIPTION

FIGS. 1-3

Figure 1:
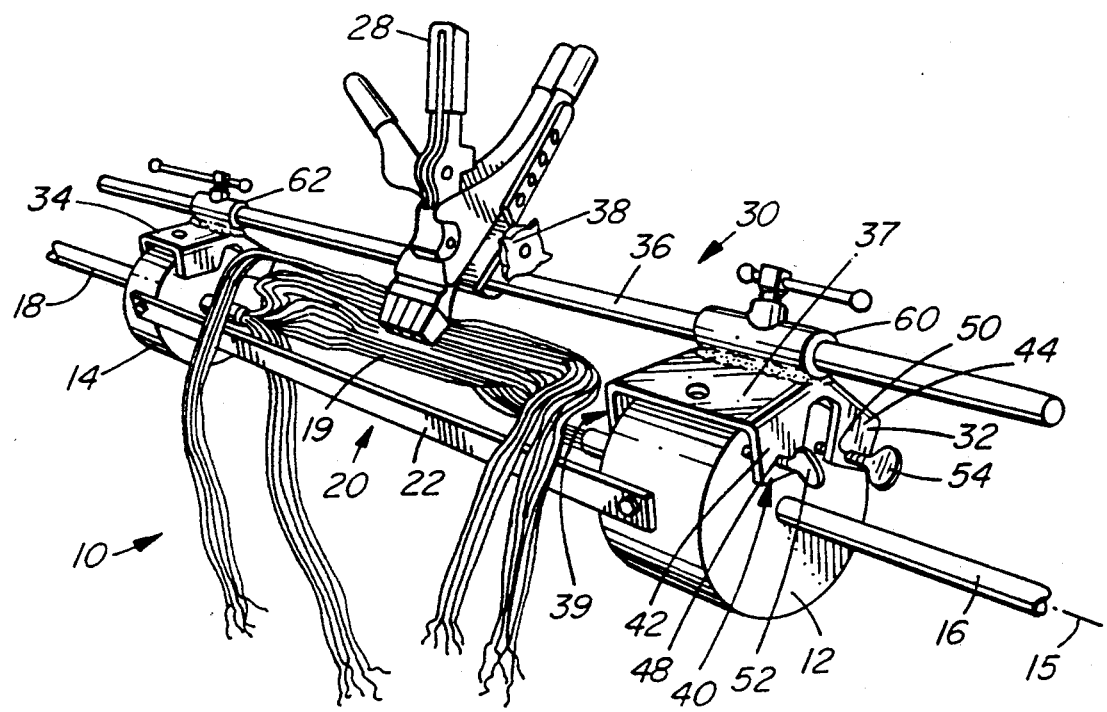
FIG. 1 is a simplified perspective view of an apparatus according to a first embodiment of the invention with a tool adapter being integral with the cable working tool.

Referring to FIG. 1, a conventional cable splice enclosure is shown generally at 10, with clam-shell type covers thereof (not shown) removed. Conventionally, such an enclosure includes first and second disc-shaped end plates 12 and 14 aligned on an axis 15, the end plates being operable to securely hold cables 16 and 18 which are to be spliced together. A splice 19 of the two cables is made in a splice work area shown generally at 20, between the end plates. Torque bars, only one of which is shown at 22, also form part of the cable splice enclosure and are bolted between the end plates on opposite sides of the enclosure. One or both of the torque bars may be removed while maintenance is being performed on the splice in the cable splice work area.

An apparatus for mounting a cable working tool 28, according to a first embodiment of the invention, is shown generally at 30. The apparatus is releasably mounted on the end plates 12 and 14. The apparatus includes first and second clamping members 32 and 34 for clamping the apparatus to respective end plates 12 and 14. An elongated straight rigid support bar 36 is held between the first and second clamping members 32 and 34 and serves to support a tool adapter 38 on which the cable working tool 28 is mounted.

Figure 2:
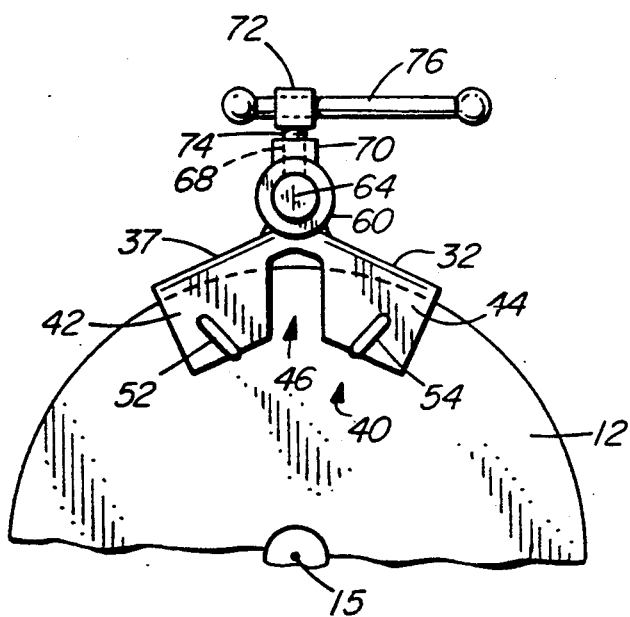
FIG. 2 is a simplified fragmented end view of the apparatus shown in FIG. 1.
Figure 3:
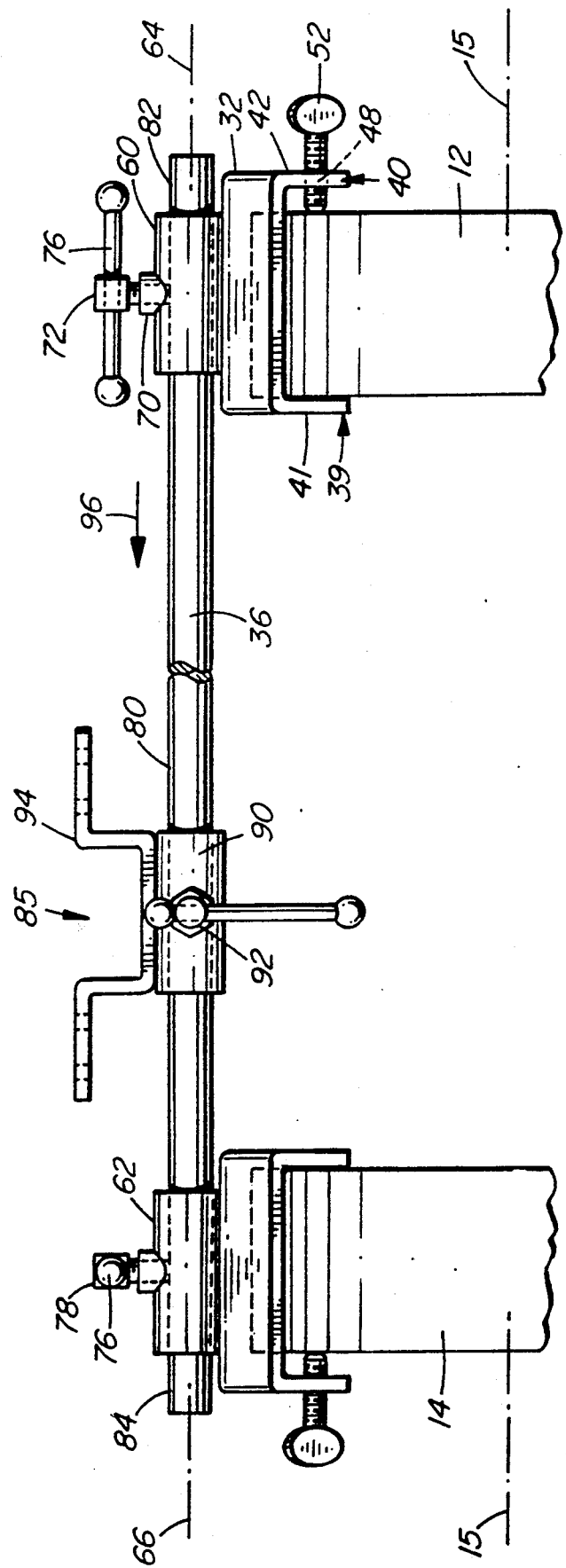
FIG. 3 is a simplified fragmented side view of the apparatus shown in FIG. 1 but fitted with an alternative general purpose tool adapter.

Referring to FIGS. 1, 2 and 3, the first and second clamping members 32 and 34 are similar and therefor only the first clamping member 32 will be described. The first clamping member 32 is formed from a length of steel channel having a body portion 37 and first and second opposite side flanges shown generally at 39 and 40 in FIGS. 1 and 3. Referring to FIG. 2, the opposite side flanges have been cut laterally to separate each side flange into longitudinally spaced apart portions, the flange 40 having first and second portions 42 and 44 separated by a space 46. The space 46 permits the body to be permanently bent at an obtuse angle to form a cradle for receiving a portion of the end plate 12. In the embodiment shown, the clamping member is installed on a top portion of the end plate. It will be appreciated that the clamping member may be installed at virtually any location around the circumference of the end plate. To this end, the space 46 is dimensioned to receive a portion of a torque bar therein, thereby permitting the apparatus to be installed directly over the torque bar.

Referring to FIG. 1, the first and second portions 42 and 44 have threaded openings 48 and 50 for receiving complementary first and second elongated threaded members 52 and 54 which, in the embodiment shown, are thumb screws. The first and second elongated threaded members are thus threadedly engaged with the clamping member 32. The threaded members 52 and 54 have ends which act as moveable jaws when the thumb screws are rotated.

Referring to FIG. 3, the first side flange 39, has first and second portions, only the first portion 41 being shown in FIG. 3. The first and second portions act as fixed jaws of the clamping member. A portion of the first end plate 12 is received between the fixed and moveable jaws, i.e. the thumb screws, the jaws cooperating to mount and secure the clamping member to the end plate.

Referring to FIG. 2, the first and second elongated threaded members 52 and 54 are parallel and spaced apart laterally so that ends thereof provide two laterally spaced apart points of contact for contacting the end plate 12. When the clamping member 32 is mounted on the end plate 12, the two points of contact are angularly spaced apart relative to the axis 15 of the end plate 12 and thus prevent angular movement of the clamping member relative to the end plate.

Referring to FIGS. 1 and 3, the first and second clamping members have first and second collars 60 and 62 respectively, the collars being secured by respective welds to their respective clamping members. The first and second collars have respective first and second axes 64 and 66. The collars are disposed laterally on their respective clamping members to dispose their respective axes 64 and 66 in alignment with each other and parallel to the axis 15 of the end plates when the apparatus is installed. The first and second collars 60 and 62 are similar and therefore only the first collar 60 is described.

Referring to FIG. 2, the first collar 60 has an opening 68 disposed centrally and radially therein. A threaded nut 70 is welded to the collar such that a circular threaded portion (not shown) of the nut is axially aligned coincident with the opening 68. A threaded member 72 having a threaded portion 74 and a slideable handle portion 76 is threaded onto the nut 70. The threaded portion has sufficient length to enable at least a portion thereof to extend into the collar. Rotation of the member 72 using the handle portion 76 is used to effect extension or retraction of the threaded portion into or out of the collar.

Referring to FIG. 3, it will be appreciated that for consistency in naming components, the threaded member 72 associated with the first collar 60, already introduced, may be called a third threaded member 72, while a threaded member associated with the second collar 62 may be called a fourth threaded member 78. The already introduced first and second threaded members are associated with the moveable jaws of the second clamping member and designated 52 and 54 respectively.

Referring to FIG. 3, the elongated rigid support bar 36 has an intermediate portion 80 and first and second opposite end portions 82 and 84. The first end portion 82 is received within the first collar 60 while the second end portion 84 is received within the second collar 62. The handle portions 76 on the third and fourth threaded members 72 and 78 may then be rotated to extend respective threaded portions of the threaded members into their respective collars 60 and 62 to clamp the first and second end portions 82 and 84 in their respective collars.

Referring to FIG. 1, in the embodiment shown, the tool adapter 38 is integral with the tool 28. A tool having such an integral tool adapter is a model VS 3 AMP Gun available from AMP Manufacturing Corporation of Canada. The tool adapter is normally used to clamp the tool onto a messenger cable of an overhead cable, however, in the embodiment shown the messenger cable is replaced by the support bar 36.

Referring to FIG. 3, an alternative general purpose tool adapter 85 is substituted for the adapter 38 and includes a collar 90 for receiving the support bar 36 therethrough. The collar 90 has a fifth threaded member 92, similar to the third and fourth threaded members 72 and 78, which is employed in a similar fashion to that of the third and fourth threaded members to secure the tool adapter 85 in any desired position along the intermediate portion 80 of the support bar 36. The collar 90 is welded to a bracket 94 to which any of a plurality of cable splicing tools may be secured. Thus, the alternative adapter 85 has spaced apart openings which are compatible with many tools, but clearly other adapters could be substituted depending on the tool requirements.

OPERATION

Referring to FIGS. 1 and 3, the use of the apparatus in connection with adapter 85 is described. To use the apparatus, the third and fourth threaded members are unscrewed to permit the end portions of the bar to be inserted into the collars on the clamping members. The first clamping member 32 is then installed on the first end portion 82 of the support bar 36 by inserting the first end portion 82 into the first collar 60. Next, the tool adapter 85 is installed on the bar by inserting the second end portion 84 through collar 90. Next, the second clamping member 34 is installed on the second end portion 84 in a manner similar to that described with respect to the first clamping member on the first end portion. The third, fourth and fifth threaded members 72, 78 and 92 are left untightened to permit the clamping members 32 and 34 and the tool adapter 85 to slide freely on the bar 36. The apparatus is now ready to install on the end plates 12 and 14.

The first and second threaded members 52 and 54 on each of the clamping members are unscrewed to permit the end plates 12 and 14 to be received between respective fixed and moveable jaws of each clamping member 32 and 34. The apparatus can now be installed on the end plates by holding the bar 36 parallel to the axis 15 of the end plates while locating the first clamping member on the first end plate 12. Locating the first clamping member 32 is done by pressing it against the end plate 12 to receive a portion of the end plate within the cradle between the first and second opposite side flanges. The first and second threaded members 52 and 54 on the first clamping member 32 are then tightened to secure the clamping member to the end plate 12. The second clamping member 34 is then located on the second end plate 14 in a similar manner to that described with respect to the first clamping member on the first end plate. The first and second threaded members on the second clamping member are then tightened to secure the second clamping member to the second end plate. The clamping members are thus secured on the first and second end plates.

The bar 36 may be moved relative to the first and second clamping members until it is located in any desired position. It may be desired, for example, to cause the length of the first end portion extending out of the first collar to be relatively long compared to the length the second end portion extending out of the second collar. This may be important if the apparatus is used near a wall which is perpendicular to the axis of the end plates or if equipment or other obstructions interfere with either of the end portions.

After locating the bar 36 with respect to the clamping members, the third and fourth threaded members 72 and 78 are tightened to secure the first and second end portions 82 and 84 in their respective collars 60 and 62. The adapter 85 may then be located in any desired position on the bar, between the clamping members 32 and 34. The fifth threaded member 92 is then tightened to secure the adapter 85 to the bar 36. A tool (not shown) may then be secured to the adapter 85 by screws (not shown). The tool is thus rendered ready for use.

It will be appreciated that when the apparatus is installed on the end plates, one or both of the torque bars may be removed from the end plates to permit access to the splice area. The apparatus maintains rigidity of the two end plates relative to each other when one of the torque bars is removed. The apparatus mounted on the end plates thus appears as a solid unit, virtually eliminating movement of the cable working tool relative to the cables on which a splice is being performed. This is particularly important in splicing fibre optic cables as individual conductors of such cables must be maintained motionless relative to each other to ensure a good quality splice.

ALTERNATIVES

FIG. 4

Figure 4:
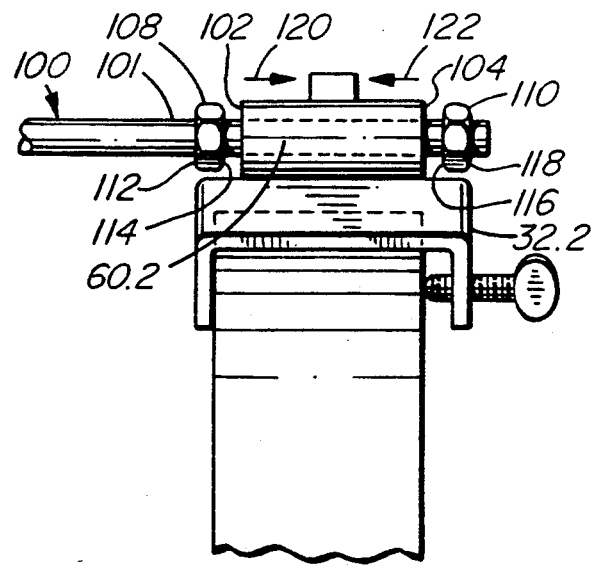
FIG. 4 is a simplified fragmented side view of an apparatus according to a second embodiment of the invention.

An apparatus according to a second embodiment of the invention is generally similar to the apparatus according to the first embodiment. Components similar to those of the first embodiment are designated by the addition of "0.2" to corresponding numerical references of the first embodiment. In the second embodiment, the third and fourth threaded members 72 and 78 seen in FIGS. 1-3 are either unscrewed so as not to interfere with the end portions of the bar, or are completely unscrewed and removed from the collars 60 and 62 as shown in FIG. 4. Also in the second embodiment, the bar 36, seen in FIGS. 1-3, is replaced by a bar 100 which is threaded along its entire length.

In the second embodiment, the apparatus has clamping members which are similar and therefore only first clamping member 32.2 is described. The first clamping member has a first collar 60.2 which can be identical to the collar 60. The first collar 60.2 has first and second axially opposite abutment faces 102 and 104. A first end portion 101 of the bar 100 has first and second nuts 108 and 110 installed thereon, opposite the respective first and second abutment faces 102 and 104. The nuts sandwich the collar. The first nut has first and second axially opposite nut abutment faces 112 and 114 and the second nut has first and second axially opposite nut abutment faces 116 and 118. The first nut 108 can be rotated to move the second abutment face of the first nut closer to the first abutment face 102 of the collar. Further rotation of the nut causes the nut abutment face 114 to act on the collar abutment face 102 to press against the collar to move the first clamping member 32.2 relative to the bar 100 in a direction indicated by arrow 120. The bar remains fixed in the second collar (not shown) on the second clamping member (not shown), therefore rotation of the first nut 108 causes the first and second clamping members and hence the first and second end plates to which they are connected, to move outwardly or away from each other.

Similarly, the second nut 110 may be rotated whereupon the first abutment face 116 of the second nut acts on the second abutment face 104 of the collar to press against the collar, tending to move it relative to the support bar 100 in an opposite direction indicated by arrow 122. This has the effect of drawing inwardly the first and second clamping members, and hence the first and second plates to which they are connected are drawn inwardly toward each other. This ability to move the first and second plates towards or away from each other by simply rotating the first or second nuts permits easy alignment of the first and second end plates so that the torque bars shown in FIG. 1 at 22, may be re-installed after maintenance on the cable splice is completed.

FIG. 5

An apparatus according to a third embodiment of the invention includes the apparatus of FIGS. of 1-3 mounted on a stand 150 rather than on the end plates 12 and 14 as shown in FIGS. 1-3. Components of the apparatus according to the third embodiment having corresponding components in the apparatus according to the first embodiment are designated by the addition of "0.3" to the numerical references of the components of the first embodiment.

Figure 5:
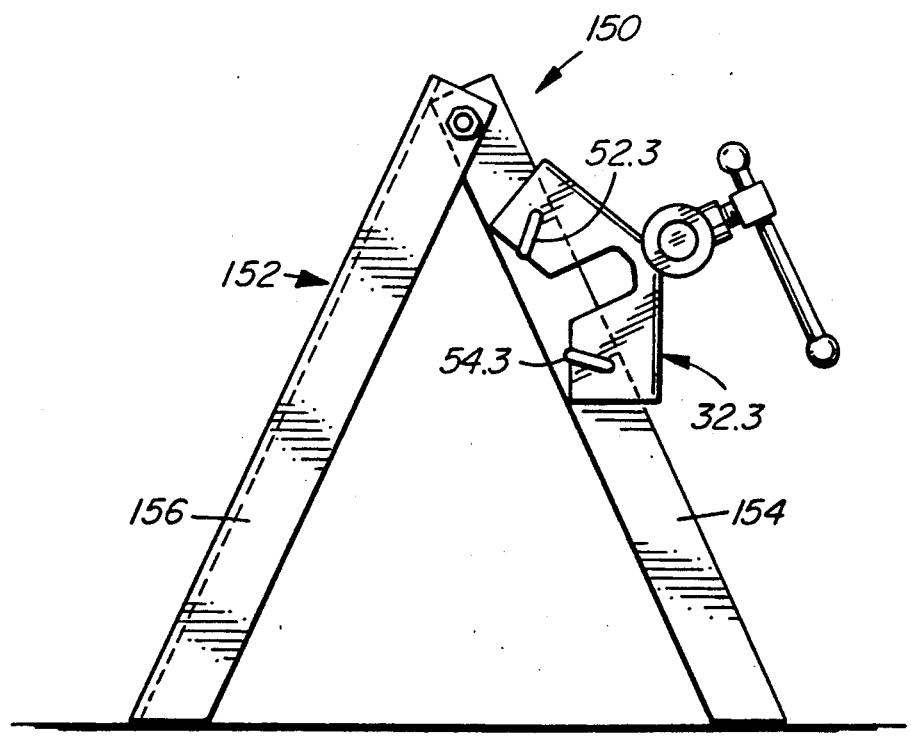
FIG. 5 is a simplified side view of an apparatus according to a third embodiment of the invention.

The stand 150 includes first and second opposite side portions, only the first side portion being shown at 152 in FIG. 5, the second side portion being similar. The first side portion has front and rear channel members 154 and 156 hingedly connected at their adjacent upper ends to form an A-frame. The first clamping member 32.3 is secured to the front member using the first and second threaded members 52.3 and 54.3. The second clamping member (not shown) is similarly secured to a corresponding front member of the second side portion (not shown). The apparatus is thus supported by the A-frame stand 150 and may be used in instances where it is undesirable to connect the apparatus to the end plates of a cable splice enclosure.

FIG. 6

Figure 6:
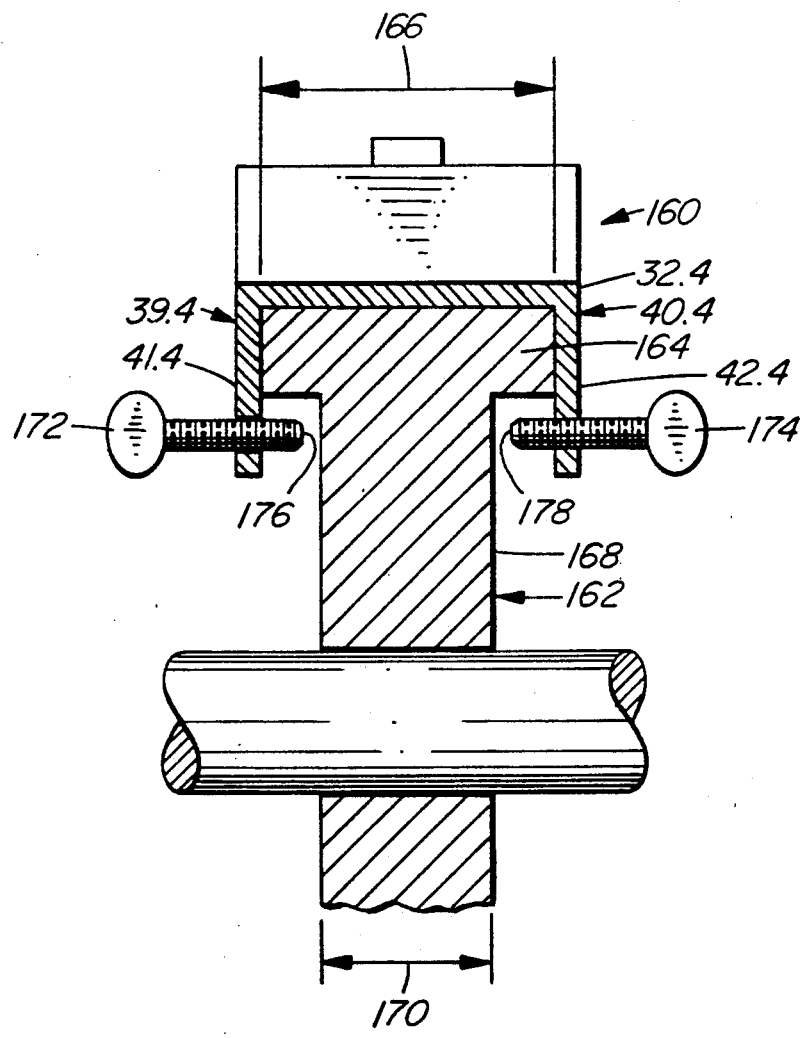
FIG. 6 is a simplified cross-sectional side view of an apparatus according to a fourth embodiment of the invention.

Referring to FIG. 6, therefore, an apparatus according to a fourth embodiment of the invention is shown generally at 160. In this embodiment, components of the apparatus according to the fourth embodiment having corresponding components in the apparatus according to the first embodiment are designated by the addition of "0.4" to the numerical references of the components of the first embodiment.

It will be appreciated by those of experience in the art that all end plates are not of uniform thickness. Referring to FIG. 6, a first clamping member 32.4 is shown mounted on a first end plate 162 of non-uniform thickness. The end plate has an outer annular portion 164 having an outer thickness 166 and an inner annular portion 168 having an inner thickness 170, the inner thickness being less than the outer thickness.

The first clamping member 32.4 has first and second opposite side flanges shown generally at 39.4 and 40.4 with only first portions 41.4 and 42.4 of respective flanges being shown in FIG. 6. Respective second portions are not shown but are similar to the first portions.

Both the first and second portions of each flange have respective threaded members threaded therethrough, only threaded members 172 and 174 on the first portions 41.4 and 42.4 being shown. The threaded members in respective second portions are similar and are not shown. Each of the threaded members has an end face such as shown at 176 and 178 on the threaded members 172 and 174 respectively.

The clamping member 32.4 is secured to the end plate by screwing-in the threaded members 172 and 174 on the first portions and the threaded members on the second portions until the end faces (only 176 and 178 being shown) abut the inner portion 168 of the end plate. The threaded members may then be tightened to secure the clamping member to the end plate. It will be appreciated that the end faces act as movable jaws for securing the clamping member to the end plate or to another desired object. A second clamping member (not shown) according to the fourth embodiment is similar to the first clamping member and is installed on the second end plate in a similar manner. The apparatus is thus secured to end plates of non-uniform thickness.

The embodiments described and shown are illustrative of the invention only and are not to be considered in limiting the invention as construed in accordance with the accompanying claims.

What is claimed is:

1. A cable working apparatus comprising:
   a) an elongated rigid support bar for supporting said tool, the support bar having first and second end portions and an intermediate portion between said end portions;
   b) first and second clamping members for clamping on to an object for supporting said apparatus, the first and second clamping members being connected to said support bar adjacent the first and second end portions respectively to rigidly hold the support bar to restrict movement of the intermediate portion relative to said object, each of said first and second clamping members having two jaws and a movable member operable to move at least one of said jaws relative to the other generally in a direction parallel to the support bar;
   c) a tool adapter mounted on and slidable freely longitudinally on at least a portion of said intermediate portion to position the tool adapter relative to the object and means for securing said adapter to the support bar to prevent movement of the tool adapter relative to the support bar; and
   d) a cable working tool being secured to the tool adapter and operable to work on cables disposed between said first and second clamping members.

2. An apparatus as claimed in claim 1 wherein at least one of said jaws has at least two spaced apart contact points for contacting the object.

3. An apparatus as claimed in claim 2 wherein said at least two contact points are provided by first and second elongated threaded members threadedly engaged with the clamping member, said elongated threaded members being operable to pinch the object.

4. An apparatus as claimed in claim 1 wherein the support bar has first and second opposite end portions and said first and second clamping members have first and second collars respectively for receiving and holding said first and second end portions respectively.

5. An apparatus as claimed in claim 4 wherein said first and second collars have respective radially threaded openings for receiving third and fourth elongated threaded members respectively for clamping said first and second end portions respectively in said first and second collars.

6. A cable working apparatus for mounting a cable working tool to opposite end plates of a cable splice enclosure, the apparatus comprising:
   a) an elongated rigid support bar for supporting said tool, the support bar having first and second end portions and an intermediate portion between said end portions, said tool cooperating with said intermediate portion;
   b) first and second clamping means for clamping onto respective end plates, the first and second end portions being connected rigidly to the first and second clamping means respectively such that said intermediate portion is disposed between the end plates, the first and second clamping members rigidly connecting said support bar to the end plates to restrict movement of the intermediate portion relative to said end plates;
   c) a tool adapter mounted on and slidable freely longitudinally on at least a portion of said intermediate portion to position the tool adapter relative to the end plates and means for securing said adapter to the support bar to prevent movement of the tool adapter relative to the support bar; and
   a cable working tool being secured to the tool adapter and operable to work on cables disposed between said first and second clamping means.

7. An apparatus as claimed in claim 6 wherein the clamping means include means for preventing angular movement of said first and second clamping means relative to said end plates.

8. An apparatus as claimed in claim 7 wherein the means for preventing angular movement includes at least two laterally spaced-apart points of contact on at least one of said first and second clamping means for contacting each of said end plates.

9. An apparatus as claimed in claim 8 wherein the first and second clamping means include first and second clamping members respectively, each of said clamping members having two jaws, at least one of said jaws being movable for mounting said first and second clamping members to said opposite end plates.

10. An apparatus as claim in claim 9 wherein said points of contact are provided by first and second elongated threaded members on each clamping member, the first and second elongated threaded members being threadedly engaged with their respective clamping member, said threaded members being operable to pinch respective end plates.

11. An apparatus as claimed in claim 9 wherein the first and second clamping means include means for preventing movement of said support bar relative to said end plates.

12. An apparatus as claimed in claim 11 wherein the support bar has first and second opposite end portions and said means for preventing movement of said support bar includes first and second collars on said first and second clamping members respectively for receiving and holding said first and second end portions respectively.

13. An apparatus as claimed in claim 12 wherein said first and second collars have respective radially threaded openings for receiving third and fourth elongated threaded members respectively for clamping said first and second end portions respectively in said first and second collars.

14. An apparatus as claimed in claim 12 wherein at least one of said end portions has a threaded portion.

15. An apparatus as claimed in claim 14 further including a threaded member having threads complementary to said threaded portion on said at least one end portion, said threaded member co-operating with one of said first and second clamping members and said support bar to move said first and second clamping members relative to each other in a direction axially of said support bar when said threaded member is rotated on said threaded portion.

16. An apparatus as claimed in claim 15 wherein at least one of said first and second collars has first and second axially opposite collar abutment faces and said threaded member includes a nut having first and second axially opposite nut abutment faces, at least one of said nut abutment faces acting on at least one of said collar abutment faces when said nut is rotated on said threaded portion to press against said collar abutment face to move said first and second clamping members relative to each other.

17. A cable working apparatus comprising:
a) an elongated rigid support bar for supporting said tool, the support bar having first and second end portions and an intermediate portion between said end portions, the intermediate portion being unobstructed to permit movement of the cable working tool therealong;
b) first and second clamping members for clamping to an object for supporting said apparatus, the first and second clamping members being connected to said support bar adjacent the first and second end portions respectively to rigidly hold the support bar to restrict movement of the intermediate portion relative to said object, each of said first and second clamping members having two jaws and a movable member operable to move at least one of said jaws relative to the other generally in a direction parallel to the support bar;
c) a tool adapter mounted on and slidable freely longitudinally on at least a portion of said intermediate portion to position the tool adapter relative to the object and means for securing said adapter to the support bar to prevent movement of the tool adapter relative to the support bar; and
d) a cable working tool being secured to the tool adapter and operable to work on cables disposed between said first and second clamping means.

* * * * *

UNITED STATES PATENT AND TRADEMARK OFFICE
CERTIFICATE OF CORRECTION

PATENT NO. : 5,103,554

DATED : April 14, 1992

INVENTOR(S) : David Ralph Homfeld

It is certified that error appears in the above-identified patent and that said Letters Patent is hereby corrected as shown below:

On the title page, Item [76]: David R. Homefeld should be identified as David R. Homfeld.

Signed and Sealed this

Nineteenth Day of October, 1993

*Attest:*

BRUCE LEHMAN

*Attesting Officer*     *Commissioner of Patents and Trademarks*